United States Patent [19]

Newman

[11] Patent Number: 4,892,713
[45] Date of Patent: Jan. 9, 1990

[54] OZONE GENERATOR

[76] Inventor: James J. Newman, 4703 Portland Rd. #34, Salem, Oreg. 97305

[21] Appl. No.: 200,826

[22] Filed: Jun. 1, 1988

[51] Int. Cl.[4] .......................... B01J 19/08; B01J 19/12
[52] U.S. Cl. .......................... 422/186.07; 422/186.14; 422/186.04; 55/143; 55/145
[58] Field of Search ...................... 422/186.07, 186.04, 422/186.2, 186.14; 55/143, 145

[56] References Cited

U.S. PATENT DOCUMENTS

| | | | |
|---|---|---|---|
| 1,011,503 | 12/1911 | Shepherd | 422/186.07 |
| 1,363,000 | 12/1920 | Lindemann | 422/186.07 |
| 1,796,110 | 3/1931 | Lechler | 422/186.07 |
| 2,113,913 | 4/1938 | Cragun | 422/186.07 |
| 2,309,616 | 1/1943 | Bagby et al. | 422/186.07 |
| 2,561,014 | 7/1951 | Daily | 422/186.07 |
| 3,081,215 | 3/1963 | Held et al. | 422/186.07 |
| 3,309,304 | 3/1967 | Caplan | 422/186.07 |
| 4,666,679 | 3/1987 | Masuda et al. | 422/186.2 |

FOREIGN PATENT DOCUMENTS

| | | | |
|---|---|---|---|
| 0006111 | 2/1976 | Japan | 422/186.07 |
| 665853 | 1/1952 | United Kingdom | 422/186.07 |

*Primary Examiner*—Howard J. Locker
*Attorney, Agent, or Firm*—F. Eugene Logan

[57] ABSTRACT

There is provided a generator for forming ozone from air. The generator is adapted to be connected to a power source and comprises a unitary grid assembly which includes a first dielectric plate, a second dielectric plate spaced apart from the first dielectric plate, a wire mesh anode located between the first and the second dielectric plates, a third dielectric plate spaced from the second dielectric plate, a cathode plate located between the second and the third dielectric plates, and a pair of dielectric spacers located between the third dielectric plate and the cathode plate. The second dielectric plate, the pair of spaces and the cathode define a space for the passage of air and the collection of ozone formed from the air. The generator also comprises a blower positioned spaced from but adjacent the grid assembly, for moving the air through the space.

20 Claims, 2 Drawing Sheets

OZONE GENERATOR

BACKGROUND OF THE INVENTION

I. Field of the Invention

The present invention relates generally to an ozone generator and, more particularly, to an ozone generator which can develop ozone at a very low voltage. Further, the ozone generator produces the ozone without producing the undesired by product of nitrous oxide.

Ozone is a known oxidizing agent which is useful to destroy bacteria, fungi and the like. The destruction of bacteria avoids the creation of undesired odors which are caused by such bacteria. For example, when used in water purification, such as cleaning of pools, fishing ponds, septic tanks and sewage treatment, the ozone kills the bacteria, algae and polio virus. In drinking water, the ozone acts to remove undesired minerals, such as iron, manganese, arsenic and sulfur dioxide. By the removal of this minerals, such as sulfur dioxide, the odors attendant with those minerals are not created and thus the environment becomes free from that odor. The possible uses for ozone are almost infinite and it is believed that such uses include oxidizing various minerals to thereby reduce auto and truck emissions, mortuary odors, and plant odors.

II. Description of the Prior Art

Ozone generators have, heretofore, been known. However, these generators have not, heretofore, provided the combination of a compact, portable generator which is simple in construction and needs little electrical power to operate yet provides a large output and produces ozone without the undesired by product of nitrous oxide.

For example, one of the earliest known ozone generators is shown in U.S. Pat. No. 991,767, which issued on May 11, 1911, to Armstrong. The generator, which was developed to produce a pure quality of ozone from the atmosphere under electrostatic stress, includes a plurality of horizontal plates of glass or other solid dielectrics, preferably rectangular in form, slightly separated from each other. A pair of vertical electrodes are connected at the ends of the dielectrics, and the electrodes in turn are connected to a transformer. On each of the dielectrics, except for the top and the bottom plates, there is provided a conducting material extending from one of the electrodes approximately two-thirds of the length of the plate in the direction of the opposite electrode. The conductor is preferably made of copper gauze, but can be made of tin-foil and has an edge at a right angle to the dielectric plates. An electric fan is in juxtaposition to the plurality of dielectric plates to force atmosphere in the spaces between the plates.

U.S. Pat. No. 2,345,798, which issued on Apr. 4, 1944, to Daily is directed to an ozone generator which comprises an air-tight housing and a series of generator units in the housing. Each generator unit includes a pair of high tension electrodes, a pair of dielectric plates, a pair of ground electrodes of aluminum or other suitable conducting material, and a pair of ozone collecting boxes.

The high tension electrodes are formed of wire screen and are cemented to the dielectric plates. The dielectric plates are made of glass or other dielectric material and are held in spaced relation with the neutral electrodes by a plurality of spacer strips which strips define ozone producing spaces between the dielectric plates and the neutral electrodes. The neutral electrodes are rectangular plates made of aluminum or other suitable conducting material.

Also, it has, heretofore, been appreciated that the dielectric plates can be made of ceramic material or some other organic substance. For example, U.S. Pat. No. 3,081,215, which issued on Mar. 12, 1963, to Held, et al is directed to a method of making an ozonizer electrode unit. The unit comprises two dielectric plates having embedded therebetween a flat, plate-shaped electrode. The plates are connected together by an adhesive binder and, while preferably made of glass, can be made of mica or ceramic material or some other organic substance. Also, U.S. Pat. No. 3,309,304, which issued on Mar. 14, 1967, to Caplan is directed to an ozone generator which comprises five electrodes in the form of stainless steel screens which are separated by dielectric dividers made of glass, mica, or plastic. Further, U.S. Pat. No. 3,496,092, which issued on Feb. 17, 1970, to Fraser is directed to a solid state corona generator in which spaced apart solid dielectric barriers are attached in opposing relation to the insides of the electrodes. The dielectric barriers are made of good insulators, such as fused quartz, alumina, mica mat or glass. See also, U.S. Pat. No. 3,622,492, which issued on Nov. 23, 1971, to Kinney, which is directed to an ozone generator in which the conventional glass plate dielectrics have been replaced by thin film polymeric material, such as Mylar polyester.

It has also been appreciated that the electrode elements may take a shape other than a flat plate. For example, U.S. Pat. No. 4,349,511, which issued on Sept. 14, 1982, to Owen is directed to an air purification apparatus which includes a modular generator assembly having a plurality of flattened coils of metal wire mesh disposed in a side-by-side array with dielectric plates, preferably of mica, across which an electrical potential is created. Also, U.S. Pat. No. 3,309,304 to Caplan, discussed above, provides that the electrodes are stainless steel screens.

However, the prior art fails to appreciate the combination of components of the grid assembly of the present invention. Further, the prior art also fails to provide for the use of porcelain as the material for the dielectric plates.

SUMMARY OF THE INVENTION

Against the foregoing background, it is a primary object of the present invention to provide an ozone generator which produces ozone using low amounts of energy.

It is another object of the present invention to provide such an ozone generator which produces ozone without producing nitrous oxide.

It is still another object of the present invention to provide such an ozone generator which is readily portable and can use a standard electrical outlet as its power source.

It is yet another object of the present invention to provide such an ozone generator which is relatively inexpensive to make.

It is still yet another object of the present invention to provide such an ozone generator which can be made from materials which are readily available.

To the accomplishments of the foregoing objects and advantages, the present invention, in brief summary, comprises an ozone generator which includes means for connecting the generator to a power source, means for moving the air through the generator and a grid assembly for forming the ozone from the air. The grid assembly comprises a first dielectric plate, a second dielectric plate spaced apart from the first dielectric plate, a wire mesh anode located between first and the second dielectric plates, a third dielectric plate spaced from the second dielectric plate, a pair of dielectric spacers and a cathode plate located adjacent one surface of the cathode plate. The pair of spacers and the cathode plate are located between the second and the third dielectric plates. The second dielectric plate, the pair of spacers and the cathode defining a space for the passage of air and the collection of ozone formed from the air. The means for connecting the generator to a power source being connected to the anode and the cathode of the grid assembly, and the means for moving the air being located adjacent one end of the space.

BRIEF DESCRIPTION OF THE DRAWINGS

The foregoing and still other objects and advantages of the present invention will be more apparent from the following detailed explanation of the preferred embodiments of the invention in connection with the accompanying drawings wherein.

DESCRIPTION OF THE PREFERRED EMBODIMENTS

Figure 1:
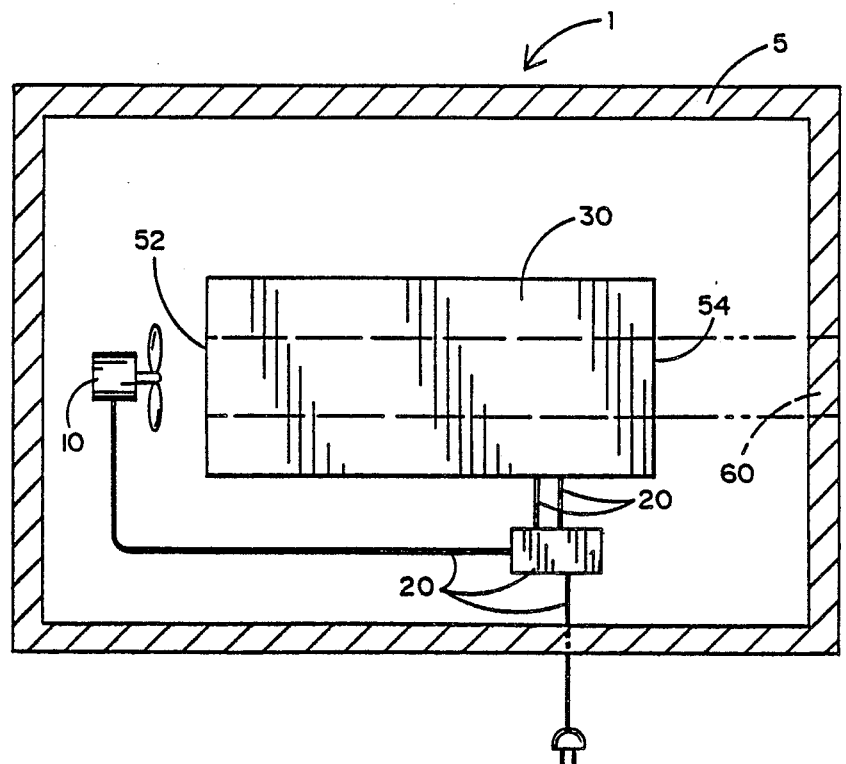
FIG. 1 is a schematic top sectional view of the ozone generator of the present invention in which the top of the generator has been removed to show the internal components of the generator.

Referring to the drawings and, in particular, to FIG. 1, there is provided an ozone generator generally represented by reference numeral 1. The generator 1 includes a housing (not shown) for containing therein a mechanism 10 for moving air, a connector 20 for connecting the generator to a power source, a grid assembly 30, and an outlet port 60 for emitting the "free" ozone, i.e. ozone formed from the air, out of the housing or body 5 of the generator.

Figure 2:
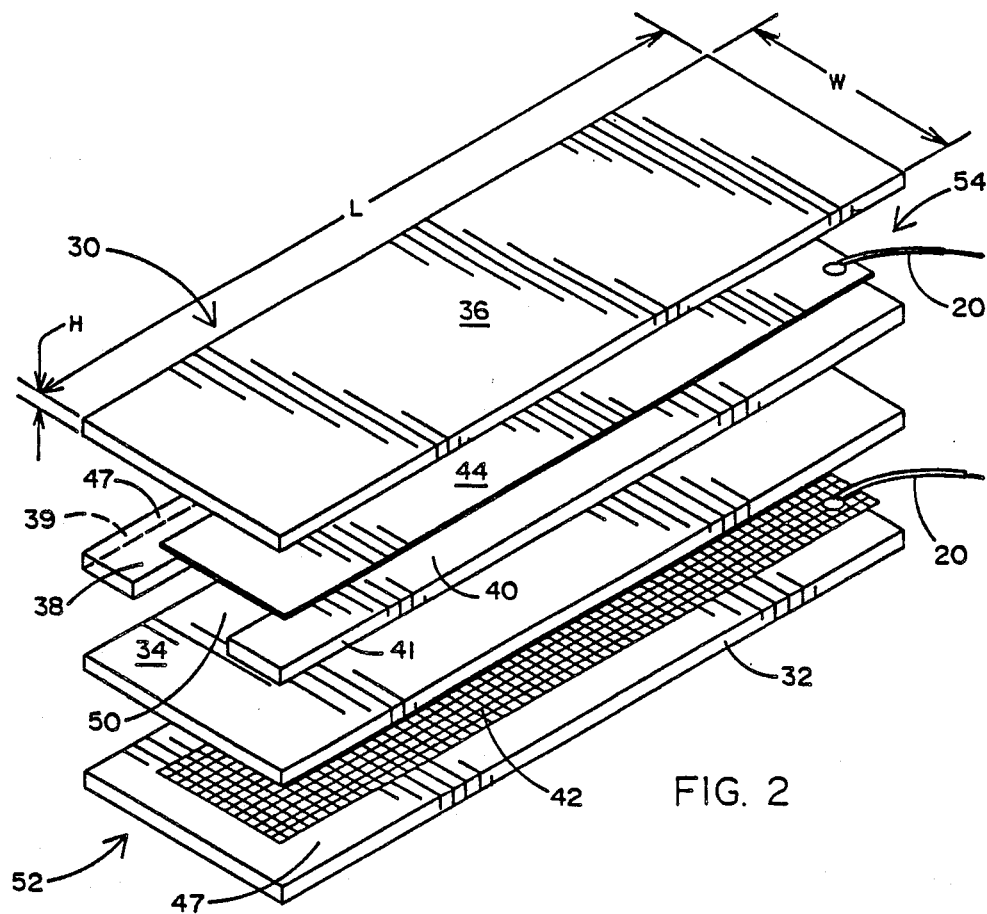
FIG. 2 is an exploded perspective view of the grid assembly of the ozone generator shown in FIG. 1.

As shown in FIG. 2, the grid assembly 30 includes at least three dielectric plates 32, 34 and 36, a pair of dielectric spacers 38, 40, an anode 42 and a cathode 44. The dielectric plates 32, 34 and 36 are spaced apart in the vertical direction shown in FIG. 2. Each of the three dielectric plates 32, 34 and 36 is basically rectangular in shape, and each has the same width W, length L and depth or height H dimensions. The dielectric plates 32, 34 and 36 can be of any width and length provided each is of approximately the same width and length. While the plates 32, 34 and 36 do not have to be rectangular, this configuration is preferred because the axial distance or length of the plates are needed to create the ozone. In a prototype of the grid assembly 30, it has been found that each dielectric plate 32, 34 and 36 should be greater than approximately one and three-eighth inches in width (radially) and greater than approximately ten inches in length (axially).

The dielectric plates should be approximately 0.064 inches in height or thickness to maximize the electric output yet not distort when heated.

The dielectric plates can be made of conventional dielectric materials, such as glass and mica, but at the minimum should be single strength glass which means glass of a thickness of approximately 0.064 inches. However, it is preferred that the plates be made of a ceramic material since ceramics are more stable than glass. Further, it is believed that ceramics are more dielectric, i.e. are less resistance to the passage of electricity so that there results better electric output. In the most preferred embodiment, the dielectric plates should be made of porcelain or any other material which both optimizes electric output, and thus the production of ozone, and simultaneously provides a cooling effect thereby making the operation of the generator more efficient.

The pair of dielectric spacers 38, 40 are spaced apart in the horizontal direction shown in FIG. 2, and each is of the same width, length and depth dimensions. The length L or axial dimension of each spacer 38, 39 is approximately the same as that of each dielectric plate 32, 34 and 36. Further, the height of each spacer 38, 40 is the same or about the same height H of each dielectric plate 32, 34 and 36. However, as shown in FIG. 2, the width of each spacer 38, 40 is much less than the width W of each dielectric plate 32, 34 and 36. The spacers 38, 40 are positioned so that the other edge 39, 41 of each spacer 38, 40, respectively, basically align with the other edges 37 of the dielectric plates 32, 34 and 36. Accordingly, the spacers 38, 40 define therebetween a space 50 through which air can flow and the ozone can be formed.

The pair of dielectric spacers 38, 40 can be made of the same material as the dielectric plates 32, 34 and 36 and, in the most preferred embodiment of the present invention, each dielectric spacer is made of porcelain. In an alternative embodiment, which is not shown, the dielectric spacers 38, 40 can be an integral part of the second dielectric plate 34, i.e. the spacers and the second dielectric plate is one piece. This alternative embodiment is preferred since it will reduce the number of components and may in fact be less expensive to manufacture.

Between the first dielectric plate 32 and the second dielectric plate 34 there is located an anode 42. The anode 42 is a wire mesh or cloth material. The material, a woven material, has many points which contact the second dielectric plate 34. These points contacting the second dielectric plate 34 each provide a discharge which produces the ozone from the air. Accordingly, it is desired to have as fine a mesh or greater number of points per square inch as possible since a lesser amount of wattage per square inch is needed to obtain the total discharge in the assembly. However, the number of points must be limited by the need that there be some spacing and that the finer the mesh the greater the amount of heat on the dielectric plate 34. Specifically, too much heat on the dielectric plate 34, no matter what the material used, can create warpage of the dielectric plate. Accordingly, another reason that the dielectric plate is preferably made of porcelain is the ability of porcelain to withstand heat and thus warpage.

It is preferred that each mesh or square in the anode 42 be approximately forty thousandths of an inch square, and that the anode 42 be approximately eighteen thousandths of an inch in thickness. In a prototype of the grid assembly discussed above, it is found that the anode 42 should be approximately one and three-eighths of an inch wide and approximately ten inches in length.

The anode can be made of any material selected from the following group of materials, copper, galvanized copper, aluminum, galvanized aluminum and stainless steel. However, stainless steel is preferred since it is impervious to ozone, does not readily oxidize when subject to ozone gas, and is a material which is readily available.

The cathode 44 is a flat, rectangular plate. It is of a size and shape smaller than that of the dielectric plates 32, 34 and 36, and analogous to that of the anode 42. The cathode 44, to obtain optimal performance in the grid assembly 30, should be made of stainless steel.

Figure 3:
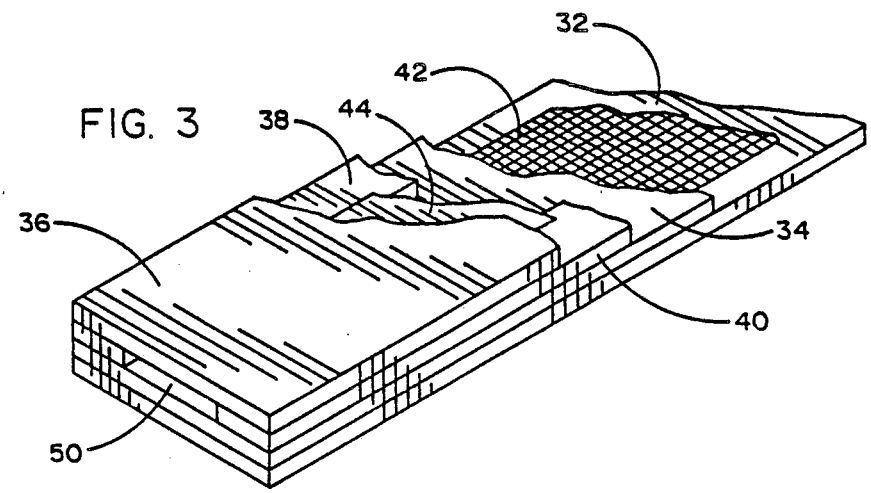
FIG. 3 is an end view, in section, of the grid assembly shown in FIG. 2.

The grid assembly 30 when formed, as shown in FIG. 3, is held together by adhesive. Specifically, adhesive is applied to the side edges 47 of the dielectric plates 32 34 and 36 and the spacers 38 and 40 which edges do not cover the anode 42 and the cathode 44. Accordingly, the adhesive bonds the first dielectric plate 32 to the second dielectric plate 34 completely sandwiching or enclosing the anode 42 therebetween. Also, the adhesive binds the second dielectric plate 34 to the spacers 38 and 40, and the adhesive binds the spacers to the third dielectric plate 36 sandwiching the cathode 44 between the spacers and the third dielectric plate. It has been found that the side edges should be approximately one-half inch in radial extent to provide for the application of adhesive without the adhesive contacting the anode 42 or the cathode 44. Thus, the dielectric plates 32, 34 and 36 should b approximately one inch wider, i.e. larger in the radial direction, than the width of the anode 42 and the cathode 44.

The type of adhesive used can be any conventional adhesive that can bind the dielectric plates together and provides good insulation. A known adhesive is sold under the registered trademark RHODOTHERM by C. R. Lawrence Co.

It should be noted that the height or thickness of the sandwich portion formed by the first dielectric plate 32, the second dielectric plate 34 and the anode 42 therebetween is approximately 0.0146 inches which consists of the 0.064 inches thickness of each plate 32, 34 and the height of the approximately 0.018 inches of thickness of the anode 42. It is believed that if the height of the sandwich portion 32, 42 and 34 is less than approximately 0.146 inches the grid assembly 30 shall not work as effectively.

When the grid assembly 30 is formed or bonded together there is provided a space 50 formed between the pair of spacers 38 and 40, the cathode 44 and the second dielectric plate 34. Air is passed through that space 50 and by the interaction of the air with the environment of the grid assembly 30, ozone is formed in that space. Specifically, the air passes from end 52 of the grid assembly through the grid assembly with the exit of the air and ozone being through end 54.

Referring to FIG. 1, the mechanism 10 for moving the air can be any conventional mechanism such as a fan or a blower. The fan or blower 10 for the prototype discussed above, which was used in conjunction with the generator having 4 to 8 grid assemblies 30, provided 350 cubic feet per minute (cfm) of air flow. If there is too little air flow, too much heat will build up, and if there is too much air flow, there will be created a back pressure so that the blower will become inefficient. The blower 10 should be positioned spaced from but relatively adjacent the end 52 of the grid assembly 30 to force the air through the assembly.

The connector 20 for connecting the grid assembly 30 to a power source (not shown), such as a conventional one hundred and twenty volt electrical outlet, includes a conventional neon transformer and may also include the conventional electrical wiring which connects the anode 42 and the cathode 44 to the transformer and the conventional electrical wiring and plug which connects the transformer to the conventional electrical outlet. Further, it may also include the wiring which connects the blower 10 to the transformer. The transformer should be as small in size and power to minimize costs, yet of a size and power sufficient to provide adequate power for the generator. Such a transformer is a 7500 volt at 45 milliamp transformer.

There is also provides an outlet port 60 positioned adjacent the end 54 of the grid assembly 30 from which the ozone emits. The outlet port 60 acts to transmit the ozone from the grid assembly 30 to a desired location. In the enclosed body 5 of the grid assembly, the outlet port 60 pierces the wall of the body so that the ozone is emitted out of the body, i.e. out of the generator 1. The outlet port 60 can be made of any conventional material, however PVC material is preferred since it is relatively inexpensive and will not decompose when in contact with ozone.

Accordingly, as shown schematically in FIG. 1 and FIG. 2, power from the power source is transmitted through the transformer and wire of the connector 20 sending by the electrical wiring power to the anode 42 and the cathode 44 of the grid assembly 30. By electrical wiring power is also sent to the blower or fan 10 so that air passes through the grid assembly 30 forming ozone from the air and the ozone is passed into outlet port 60 and out of the generator.

Having thus described the invention with particular reference to the preferred forms thereof, it will be obvious that various changes and modifications may be made therein without departing from the spirit and scope of the invention as defined by the appended claims.

Wherefore I claim:

1. An unitary grid assembly for a generator for forming ozone from air, said grid assembly and such generator requiring a low amount of energy and no coolant, said grid assembly comprising:
   a first dielectric plate;
   a second dielectric plate spaced apart from said first dielectric plate;
   a wire mesh anode located between said first and said second dielectric plates, and spaced away from the perimeter of said dielectric plates, the perimeters of said dielectric plates being bonded together;
   a cathode plate spaced away from said second dielectric plate; and
   a pair of dielectric spacers located between said second dielectric plate and said cathode plate, said cathode plate being spaced away from the outside perimeter of said pair of dielectric spacers,
   wherein said second dielectric plate, said pair of spacers and said cathode plate define a space for the passage of air and the formation of ozone formed from the air.

2. The unitary grid assembly of claim 1, wherein said first and said second dielectric plates are of the same size and shape.

3. The unitary grid assembly of claim 2, wherein each of said pair of dielectric spacers is of the same axial extent as said dielectric plates.

4. The unitary grid assembly of claim 2, wherein each of said pair of dielectric spacers has a width less than that of said dielectric plates.

5. The unitary grid assembly of claim 1, wherein said dielectric plates and said dielectric spacers are porcelain.

6. The unitary grid assembly of claim 1, wherein said anode is made of material selected from the group consisting of copper, galvanized copper, aluminum, galvanized aluminum and stainless steel.

7. The unitary grid assembly of claim 1, wherein said anode is stainless steel.

8. The unitary grid assembly of claim 1, wherein said cathode plate is stainless steel.

9. The unitary grid assembly of claim 1, wherein said pair of dielectric spacers are integral with said second dielectric plate.

10. The unitary grid assembly of claim 1, wherein the mesh size of said wire mesh anode is forty thousandths of inch.

11. The unitary grid assembly of claim 1, wherein the outside perimeter of said second dielectric plate is bonded to the outside perimeter of said pair of dielectric spacers.

12. The unitary grid assembly of claim 3, wherein said dielectric plates are sized larger than said anode and said cathode plate.

13. The unitary grid assembly of claim 1, further comprising a third dielectric plate adjacent said cathode plate.

14. The unitary grid assembly of claim 13, wherein the outside perimeter of said third dielectric plate is bonded to the outside perimeter of said pair of dielectric spacers.

15. A generator for forming ozone from air, said generator requiring a low amount of energy and no coolant and being adapted to be connected to a power source, said generator comprising:
a unitary grid assembly having:
a first dielectric plate;
a second dielectric plate spaced apart from said first dielectric plate;
a wire mesh anode located between said first and said second dielectric plates, and spaced away from the perimeter of said dielectric plates, the perimeters of said dielectric plates being bonded together;
a cathode plate spaced away from said second dielectric plate; and
a pair of dielectric spacers located between said second dielectric plate and said cathode plate, said cathode plate being spaced away from the outside perimeter of said pair of dielectric spacers,
wherein said second dielectric plate, said pair of spacers and said cathode plate define a space for the passage of air and the formation of ozone formed from the air; and
means, located spaced from but adjacent said grid assembly, for moving air through said space.

16. The generator of claim 15, further comprising a transformer, means for connecting said transformer to said anode and said cathode plate, and means for connecting said transformer to a power source.

17. The generator of claim 15, further comprising means for emitting ozone formed in said generator from said generator.

18. A generator for forming ozone from air, said generator requiring a low amount of energy and no coolant and being adapted to be connected to a power source, said generator comprising:
a unitary grid assembly having:
a first porcelain dielectric plate;
a second porcelain dielectric plate spaced apart from said first dielectric plate;
a wire mesh anode located between said first and said second dielectric plates, and spaced away from the perimeter of said dielectric plates, the perimeters of said dielectric plates being bonded together;
a stainless steel cathode plate spaced away from said second dielectric plate; and
a pair of porcelain dielectric spacers located between said second dielectric plate and said cathode plate, said cathode plate being spaced away from the outside perimeter of said pair of dielectric spacers,
wherein said second dielectric plate, said pair of spacers and said cathode plate define a space for the passage of air and the formation of ozone formed from the air; and
means, located spaced from but adjacent said grid assembly, for moving air through said space.

19. A generator for forming ozone from air, said generator requiring a low amount of energy and no coolant and being adapted to be connected to a 120 volt electrical power source, said generator comprising:
a unitary grid assembly having:
a first porcelain dielectric plate;
a second porcelain dielectric plate spaced apart from said first dielectric plate, wherein said first and said second dielectric plates are of the same size and shape;
a stainless steel wire mesh anode located between said first and said second dielectric plates, said anode being sized smaller than said dielectric plates and spaced away from the perimeter of said dielectric plates, the perimeters of said dielectric plates being bonded directly together thereby forming a sealed anode assembly wherein said anode is sealed in and between the central portion of said first and said second dielectric plates;
a stainless steel cathode plate sized smaller than said dielectric plates and spaced away from said second dielectric plate; and
a pair of porcelain dielectric spacers located between said second dielectric plate and said cathode plate, the width of each of said pair of dielectric spacers being less than the width of said anode assembly, the outside perimeter of said second dielectric plate being bonded to the outside perimeter of said pair of dielectric spacers, said cathode plate being spaced away from the outside perimeter of said pair of dielectric spacers,
wherein said second dielectric plate, said pair of spacers and said cathode plate define a space for the passage of air and the formation of ozone formed from the air;
means, located spaced from but adjacent said grid assembly, for moving air through said space;
a transformer;
means for connecting said transformer to said anode and said cathode plate;
means for connecting said transformer to a power source; and
means for emitting ozone formed is said generator from said generator.

20. The generator of claim 19, further comprising a third dielectric plate of the same size and shape as said second dielectric plate and adjacent said cathode plate, the outside perimeter of said ;third dielectric plate being bonded to the outside perimeter of said pair of dielectric spacers.

* * * * *